W. M. WHITE.
Improvement in Mosquito-Net Frames.
No. 133,279. Patented Nov. 19, 1872.
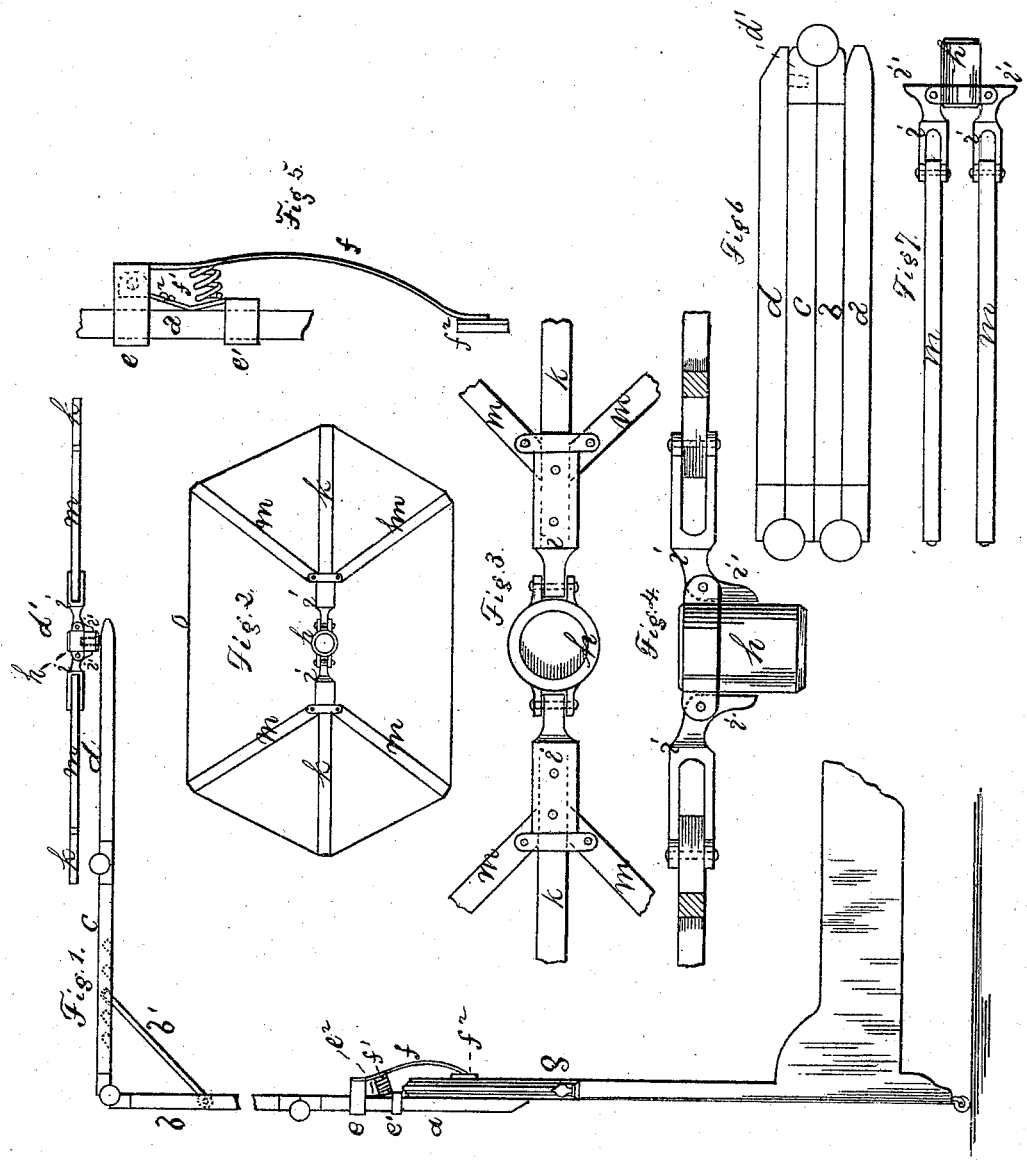
Witnesses
J. W. Howard
Geo. W. Rothwell
Inventor
Willard M. White

UNITED STATES PATENT OFFICE.

WILLARD M. WHITE, OF CANTON, CONNECTICUT.

IMPROVEMENT IN MOSQUITO-NET FRAMES.

Specification forming part of Letters Patent No. 133,279, dated November 19, 1872.

*To all whom it may concern:*

Be it known that I, WILLARD M. WHITE, of Canton, in the county of Hartford and State of Connecticut, have invented certain new and useful Improvements in Folding Mosquito-Net Frames, of which the following is a specification, reference being had to the accompanying drawing, in which—

Figure 1 is a side elevation of the device, extended and attached to a bedstead. Fig. 2 is a plan or top view of that part of the device which may be termed the "spreader." Fig. 3 is an enlarged detached top view of that part of the device which may be termed the "spreader-joint," extended. Fig. 4 is a side view of the parts shown in Fig. 3. Fig. 5 is a detached enlarged side view of that part of the device which may be termed the "clamp." Fig. 6 is a side view of that part of the device which may be termed the "extending-rod," folded up; and Fig. 7 is a view of the "spreader" folded up.

The device is a frame for supporting a mosquito net or bar attached to a bedstead or its equivalent.

The letters $a\ b\ c\ d$ indicate the four joints of an extending-rod, which will fold together, as shown in Fig. 6, the joints being properly hinged together for that purpose, or which may be unfolded or extended, as shown in Fig. 1. A pawl, $b'$, is so hinged to the joint $b$ that it will lie in a slot in the side of the joint when the extending-rod is to be folded up, and which is used to sustain the horizontal part of the extending-rod when the rod is unfolded or extended. There are different notches in the under side of the joint $c$, into which the end of the pawl fits, so that the horizontal part may be elevated, within suitable limits, as desired. A clamp fits upon the joint $a$, having a socket or sockets, $e\ e^1$, which slide upon the joint. Attached to this socket, by a pivot or hinge joint, is the clamping-hand $f$, pulled toward the joint $a$ by the spring $f^1$, so that the joint $a$ and this clamping-hand will embrace the head $g$ of the bed, or any other proper support, tightly enough to support the other parts of the device. On the end of the joint $d$ is a pin, $d'$, extending upward, on which pin sits the "spreader," this pin entering the center of the "spreader-joint." This spreader-joint has a central body, $h$, to the two opposite into which are rigidly fixed the "spreader-arms" $k\ k$, and to which are hinged the arms $m\ m\ m\ m$, which latter arms are shown extended in Figs. 2 and 3, but which can be folded flatly against the arms $k\ k$ when the device is to be folded up, and when these arms are thus folded up the whole can be folded up, as shown in Fig. 7. When the spreader is extended the pawl-points $i'\ i'$ prevent the spreader-arms from falling below a horizontal. To the ends of the spreader-arms may be attached, either temporarily or permanently, a cord, $o$. If the attachment is to be temporary, I prefer to use an elastic cord and to have the ends of the arms appropriately grooved to receive the cord and hold it. Instead of attaching the extending rod to the head-board by a spring clamp, it may be done by means of a screw-clamp. The pin $d'$ has a little play, so that the spreader may be kept horizontal however much the extending-rod is elevated. It is preferable that the end of the hand $f$ be equipped with rubber or other soft cushions, $f^2$, so as not to mar the bed. When the rod is folded up, as shown in Fig. 6, the pin $d'$ enters a hole made for it in the joint $c$, as shown in dotted lines.

The netting is, of course, suspended upon the spreader, and falls from thence upon and over the bed.

From this description it is seen that the whole is composed of only three pieces—the spreader, extending-rod, and clamp—and that the whole can be folded up into a very small compass. The socket $e^1$ is attached to the piece $e^2$, the upper end of which is pivoted within the socket $e$, thus forming, as a whole, a new and peculiar socket.

I claim as my invention—

1. The combination of the clamp, the rod $a\ b\ c\ d$, and the spreader, constructed and arranged to operate, substantially as described, for the purpose set forth.

2. The jointed extending-rod provided with the pawl $b'$, the whole constructed and designed for use, substantially as described, for the purpose set forth.

3. The clamp composed of the two sockets, the one hinged to the other and provided with the hand $f$, equipped or unequipped with the sides of which are pivoted the pawl-sockets $ii$, cushion $f^2$, the whole constructed and designed to operate substantially as described, for the purpose set forth.

4. The spreader-joint composed of the central body $h$ and the pawl-sockets $i$ hinged thereto, and provided with the pawl-points $i'$, the whole constructed and designed to operate substantially as described, for the purpose set forth.

5. The spreader-joint, as specified in the last clause, combined with the arms $k\,k$, and the arms $m$ hinged thereto, substantially as described, and for the purpose set forth.

WILLARD M. WHITE.

Witnesses:
    WM. E. SIMONDS,
    J. POLLITT.